(12) United States Patent
Famularo et al.

(10) Patent No.: US 12,135,191 B2
(45) Date of Patent: Nov. 5, 2024

(54) METHODS AND APPARATUS FOR POINTING LOGIC IN AIRCRAFT

(71) Applicant: The Boeing Company, Arlington, VA (US)

(72) Inventors: Douglas Famularo, Boston, MA (US); Jeffery Saunders, Quincy, MA (US)

(73) Assignee: The Boeing Company, Arlington, VA (US)

( * ) Notice: Subject to any disclaimer, the term of this patent is extended or adjusted under 35 U.S.C. 154(b) by 62 days.

(21) Appl. No.: 18/166,222

(22) Filed: Feb. 8, 2023

(65) Prior Publication Data

US 2024/0271911 A1   Aug. 15, 2024

(51) Int. Cl.
| | |
|---|---|
| *F41G 5/18* | (2006.01) |
| *B64U 10/14* | (2023.01) |
| *B64U 101/16* | (2023.01) |
| *F41J 9/08* | (2006.01) |
| *G05D 1/00* | (2024.01) |

(52) U.S. Cl.
CPC ............ *F41G 5/18* (2013.01); *G05D 1/0094* (2013.01); *G05D 1/0808* (2013.01); *B64U 10/14* (2023.01); *B64U 2101/16* (2023.01); *F41J 9/08* (2013.01)

(58) Field of Classification Search
CPC ...... F41G 5/18; G05D 1/0094; G05D 1/0808; B64U 2101/16; B64U 10/14; F41J 9/08
See application file for complete search history.

(56) References Cited

U.S. PATENT DOCUMENTS

| | | | |
|---|---|---|---|
| 2018/0162527 A1 | 6/2018 | Hupp et al. | |
| 2019/0129427 A1* | 5/2019 | Sugaki | B64D 7/00 |
| 2020/0132416 A1* | 4/2020 | Townsend | F41G 3/08 |
| 2020/0223543 A1* | 7/2020 | Singh | B64C 39/022 |
| 2023/0264837 A1* | 8/2023 | Shitrit | B64D 7/06 |
| | | | 89/37.16 |

FOREIGN PATENT DOCUMENTS

WO    2022069957 A1    4/2022

OTHER PUBLICATIONS

Bar-Itzhack et al., "Pointing in Real Euclidean Space," American Institute of Aeronautics and Astronautics, Inc., Journal of Guidance, Control, and Dynamics, vol. 20, No. 5, Sep.-Oct. 1997, 7 pages.
European Patent Office, "Extended European Search Report," issued in connection with European Application No. 24153632.5, Jun. 27, 2024, 9 pages.

* cited by examiner

*Primary Examiner* — Laura A Gudorf
(74) *Attorney, Agent, or Firm* — HANLEY, FLIGHT & ZIMMERMAN, LLC

(57) ABSTRACT

Methods and apparatus for pointing logic in aircraft are disclosed. A disclosed example apparatus to aim an aiming device carried by an aircraft includes at least one memory, machine readable instructions, and processor circuitry. The processor is to at least one of instantiate or execute the machine readable instructions to determine a position of a target, determine an orientation of the aircraft, determine aiming points based on the orientation and a movement range of the aiming device, and determine a movement of at least one of the aircraft or the aiming device based on the aiming points and the position to orient the aiming device toward the target.

20 Claims, 12 Drawing Sheets

METHODS AND APPARATUS FOR POINTING LOGIC IN AIRCRAFT

FIELD OF THE DISCLOSURE

This disclosure relates generally to aircraft and, more particularly, to methods and apparatus for pointing logic in aircraft.

BACKGROUND

In recent years, some unmanned aerial vehicles (UAVs) or drones have employed aiming/pointing devices, such as drone engagement devices (DEDs). In particular, the DEDs can be utilized on a UAV to disable and/or capture another UAV, which can be trespassing or operating in an unauthorized area and/or airspace. Typically, common DED systems point, direct and/or aim a DED at a target via a gimbal. In particular, gimbaled cameras can calculate a required azimuth and/or elevation to the target and move the gimbal accordingly. These DED systems have enough degrees of freedom such that gimbal control commands can cause the DED to be oriented at elevation and azimuth angles corresponding to the target.

SUMMARY

A disclosed example apparatus to aim an aiming device carried by an aircraft includes at least one memory, machine readable instructions, and processor circuitry. The processor is to at least one of instantiate or execute the machine readable instructions to determine a position of a target, determine an orientation of the aircraft, determine aiming points based on the orientation and a movement range of the aiming device, and determine a movement of at least one of the aircraft or the aiming device based on the aiming points and the position to orient the aiming device toward the target.

An example non-transitory machine readable storage medium comprising instructions that, when executed, cause processor circuitry to at least determine a position of a target, determine an orientation of an aircraft carrying an aiming device, determine aiming points based on the orientation and a movement range of the aiming device, and determine a movement of at least one of the aircraft or the aiming device based on the aiming points and the position to orient the aiming device toward the target.

Figure 1:
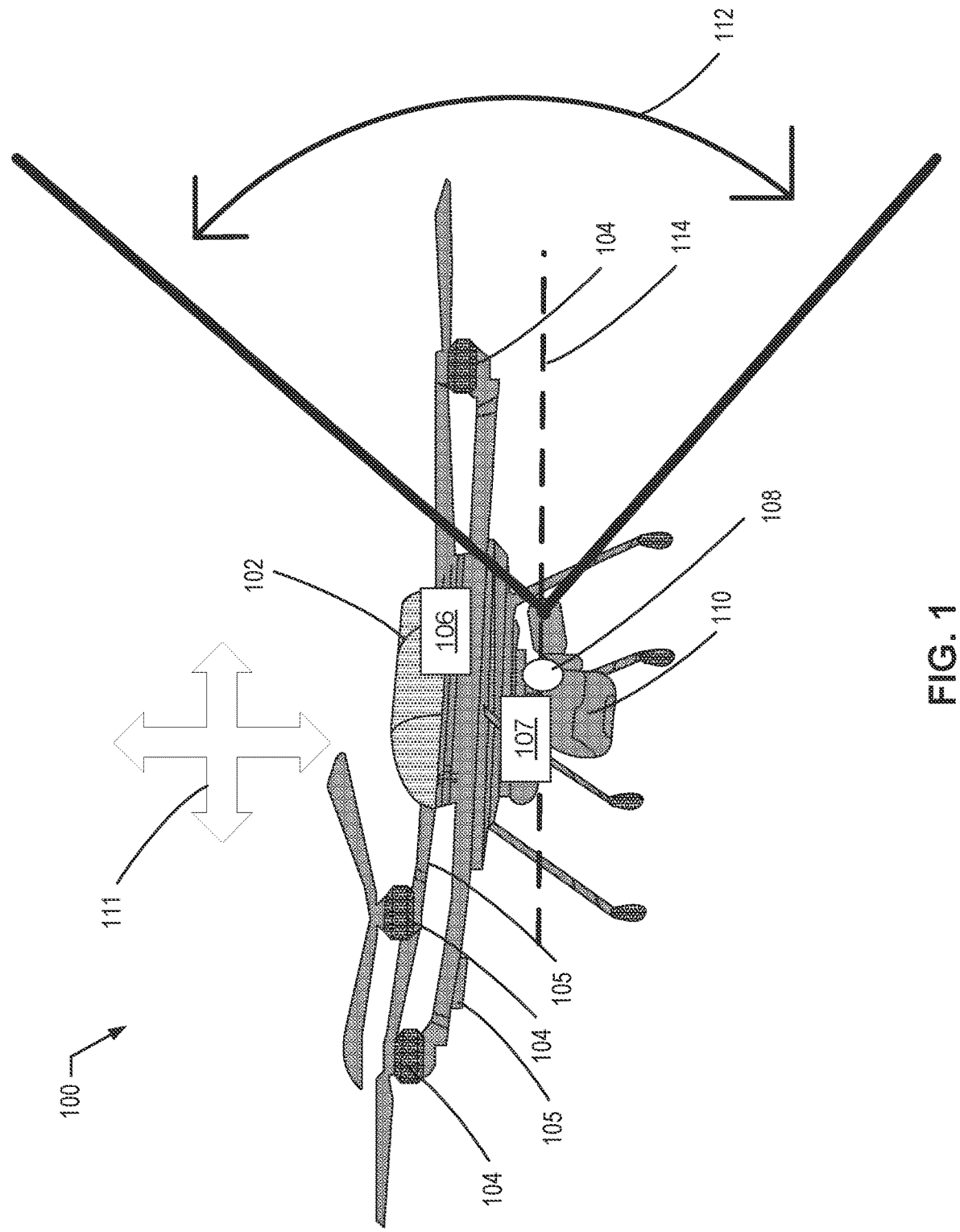
FIG. 1 is an aircraft in which examples disclosed herein can be implemented.

In general, the same reference numbers will be used throughout the drawing(s) and accompanying written description to refer to the same or like parts. The figures are not to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Methods and apparatus for pointing logic in aircraft are disclosed. In recent years, some unmanned aerial vehicles (UAVs) or drones have employed aiming/pointing devices, such as drone engagement devices (DEDs). In particular, the DEDs can be utilized on a UAV to disable and/or capture another UAV, which can be trespassing or operating in an unauthorized area and/or airspace. Typically, common DED systems point, direct and/or aim a DED at a target via a gimbal. In particular, gimbaled cameras can calculate a required azimuth and/or elevation to the target and move the gimbal accordingly. Usually, these DED systems have enough degrees of freedom such that gimbal control commands can move the DED to be oriented at elevation and azimuth angles corresponding to the target.

Examples disclosed herein can accurately control a gimbal or other movement device with elevation controls to accommodate aircraft maneuvering. In particular, the aircraft maneuvering can affect angles and/or a range of an aiming/pointing device, such as a DED for example. Typically, in known systems, control of the gimbal for moving a DED involves a pitch command to aim the DED toward the target whereby an operator determines a path and/or trajectory to aim the DED toward the target. With UAVs that utilize quad rotor configurations, a yaw angle can be independent of roll and pitch. Accordingly, the yaw angle can be adjusted to point and/or aim the DED toward the target. However, known systems do not take into account roll and pitch angular rates, angles, etc. in maneuvering a UAV. In contrast, examples disclosed herein can enable a relatively quick response that mitigates sources of errors that can affect aiming of the DED. Examples disclosed herein can also accommodate for aiming errors that can result from momentary/reactionary motion (e.g., yaw, pitch and/or roll) of a UAV (e.g., a UAV quadcopter).

Examples disclosed herein enable accurate and responsive control of an aiming/pointing device, such as a weapon (e.g., a gun, a bolo gun, a projectile firing device, a gun, a rail gun, etc.), a disabling device, a jamming device, a delivery device, a camera, a warhead, a net, a net launcher, a capture device, a spray device, etc. Examples disclosed herein determine a position of a target, as well as an orientation, which can include a yaw, a pitch and/or a roll, of an aircraft carrying the aiming/pointing device. In turn, aiming points corresponding to a movement range (e.g., an elevation range, a swivel range, etc.) of the aiming/pointing device are determined based on the orientation. Accordingly, a movement of at least one of the aircraft or the aiming/pointing device is determined based on the aiming points to orient and/or aim the aiming/pointing device toward the target.

In some examples, the aforementioned aircraft and the target are UAVs. In some examples, the aiming/pointing device swivels and/or pivots about an axis of rotation (e.g., a rotational axis) to orient the aiming/pointing device toward the target. Additionally or alternatively, movement of the aircraft is caused to aim the aiming/pointing device toward the target. In some examples, the aiming/pointing device includes a camera or a net for capture of another UAV. In some examples, the movement of the aircraft and/or the aiming/pointing device is determined based on an angular velocity of the aiming/pointing device. In some examples, a projectile motion (e.g., caused by gravity) and/or speed of a projectile fired from the aiming/pointing device is utilized in determining the movement.

FIG. 1 is an aircraft 100 in which examples disclosed herein can be implemented. In the illustrated example of FIG. 1, the aircraft 100 is a UAV (e.g., a UAV kill vehicle), which is implemented as a quadcopter and includes a body 102, rotors 104 extending from arms 105, a flight controller (e.g., a navigation controller, etc.) 106, and a targeting controller 107. Further, the example aircraft 100 includes an actuator or movement device 108 that controls movement (e.g., a swivel movement) of an aiming/pointing device (e.g., an aiming device, a pointing device, a directional device, etc.) 110.

To direct movement of the aircraft 100, the rotors 104 are controlled to vary a yaw, a pitch and/or a roll of the aircraft 100. In particular, thrusts of each of the rotors 104 are individually controlled to move and/or navigate the aircraft 100 (e.g., while the aircraft 100 is in a hovering state), as generally indicated by arrows 111. According to particular examples, the aircraft 100 can be moved and translated in at least two directions while the rotors 104 enable hovering thereof. In particular, the aircraft can translate in multiple lateral directions, as well as rotate along a yaw direction, while hovering. While the aircraft 100 is depicted as a quadcopter in this example, any appropriate type and/or classification of manned or unmanned aircraft can be implemented instead.

To aim and/or direct movement of the aiming/pointing device 110, the actuator 108 can cause the aiming/pointing device 110 to swivel about a single axis of rotation 114, as generally indicated by a double arrow 112. In particular, the aiming/pointing device 110 can move and/or swivel independently of motion of the aircraft 100. In this example, the aiming/pointing device 110 can pivot, swivel and/or rotate about the axis of rotation 114. However, in other examples, the aiming/pointing device 110 can swivel about multiple axes of rotation downward and upward in the illustrated view of FIG. 1. In this example, the aircraft 100 utilizes a combination of aircraft movement/orientation and swivel of the aiming/pointing device 110 to enable the aiming/pointing device 110 to be directed and/or aimed toward a target. As a result, the aiming/pointing device 110 can perform its function (e.g., shooting, capturing images, firing a net at, etc.) at the target.

Examples disclosed herein enable accurate control of the aircraft 100 and/or the aiming/pointing device 110 such that movement and/or rotation of the aiming/pointing device 110 can be directed to point the aiming/pointing device 110 toward the target while mitigating the effects of errors that can result from differences in orientation between the aircraft 100 and the target, movement ranges of the aiming/pointing device 110, etc. Accordingly, examples disclosed herein enable accurate targeting that mitigates movement of the aircraft 100, as well as sources of error in aiming the aiming/pointing device 110.

Figure 2A:
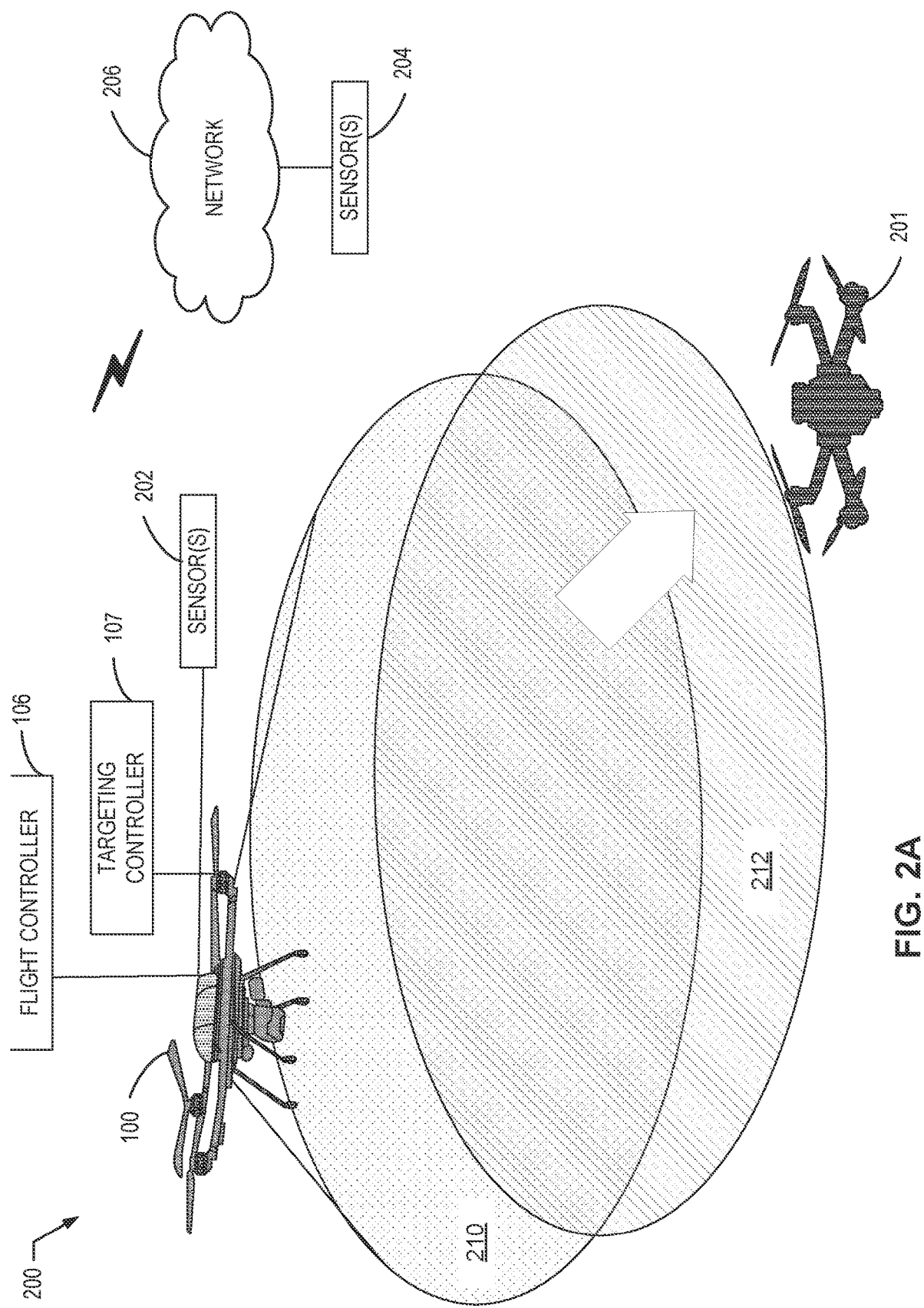
FIG. 2A depicts an example pointing system in accordance with teachings of this disclosure.

FIG. 2A depicts an example pointing system 200 in accordance with teachings of this disclosure. In the illustrated example of FIG. 2A, the pointing system 200 is at least partially included in, integrated with and/or part of the aircraft 100. In this example, the aircraft 100 is shown targeting a target (e.g., a target aircraft, a target UAV, etc.) 201 by tracking the target 201 via sensor information from at least one sensor 202 in conjunction with the aforementioned flight controller 106 and/or the targeting controller 107. Additionally or alternatively, sensors 204 located away from (e.g., external to) the aircraft 100 are implemented to provide sensor information for tracking the target 201 (e.g., sensor information pertaining to a position, relative position and/or orientation of the target 201). In some such examples, a network 206 can be utilized to provide information regarding the target 201 from the sensor(s) 204 to the aircraft 100.

To aim and/or orient the example aiming/pointing device 110 (shown in FIG. 1) at/toward the target 201, an aiming region (e.g., aiming points, an aiming zone, etc.) 210 is determined. In this example, the aiming region 210 is determined based on an orientation (e.g., a yaw, a pitch, a roll) and a position of the aircraft 100 (e.g., a relative position of the aircraft 100 to the target 201). According to examples disclosed herein, the aiming region 210 corresponds to an area, zone, line, region and/or volume by which the aiming/pointing device 110 can be moved to point and/or aim at the target 201. In other words, the aiming region 210 is defined by a movement range of the aiming/pointing device 110 in combination with the position and the orientation of the aircraft 100. Accordingly, as depicted in the example of FIG. 2A, the aircraft 100 can be moved (e.g., translated, rotated, rolled, yawed, etc.) to cause the aiming region 210 to be moved such that an updated (e.g., updated based on movement of the aircraft 100) or subsequent aiming region 212 intersects (e.g., envelopes, contains, etc.) the target 201. As a result, the aforementioned aiming/pointing device 110 is directed and/or oriented toward the target 201. According to examples disclosed herein, the aircraft 100 and the pointing device 110 can be moved simultaneously. In some examples, the aiming/pointing device 110 is a weapon (e.g., a gun, a bolo gun, a projectile firing device, a gun, a rail gun, etc.) or a disabling device that is utilized to render the target 201 inoperable. Additionally or alternatively, the aiming pointing/device 110 includes a jamming device, a delivery device, a camera, a warhead, a net, a net launcher, a capture device, etc. In some examples, both the aircraft 100 and the target 201 are UAVs.

In some examples, the movement of the aircraft 100 and/or the aiming/pointing device 110 is determined based on an angular velocity of the aiming/pointing device 110. Additionally or alternatively, the movement of the aircraft 100 and/or the aiming/pointing 110 device is determined based on an orientation and/or speed of the target 201. In examples where the aiming/pointing device 110 is a weapon, the movement of the aircraft 100 and/or the aiming/pointing device 110 is based on a projectile speed of a projectile fired from the weapon. Additionally or alternatively, in some such examples, the aiming region 210 is defined based on the aforementioned projectile speed.

Figure 2B:
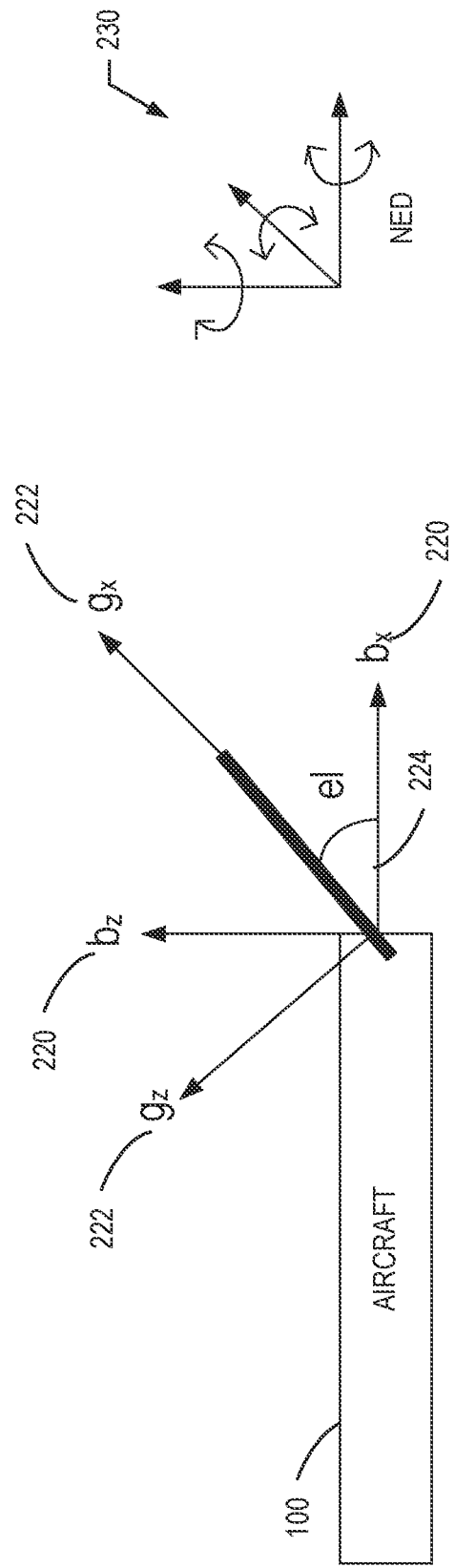
FIG. 2B depicts example coordinate frames that can be implemented in examples disclosed herein.

FIG. 2B depicts example coordinate frames that can be implemented in examples disclosed herein. In the illustrated example of FIG. 2B, coordinate axes 220 represent body axes of the aircraft 100 (with the y-axis pointing into and out of the page of FIG. 2B) while coordinate axes 222 represent axes of the aiming/pointing device 110 shown in FIG. 1. Further, an example elevation angle 224 is shown. The example elevation angle 224 corresponds to an angle and/or displacement of the aiming/pointing device 110 relative to a body frame of the aircraft 100. In some examples, a pivot (e.g., a pivot point) and/or axis of rotation of the aiming/pointing device 110 corresponds to a center of gravity of the aircraft 100.

In the illustrated example, a coordinate frame 230 corresponds to a North-East-Down (NED) frame of the aircraft 100 with corresponding rotational axes. As used herein and in Equations 1-42 below, the superscript b corresponds to vectors in the body frame while the subscript d corresponds to the reference frames associated with the aiming/pointing device 110. However, any other appropriate coordinate frames can be implemented instead.

Figure 3:
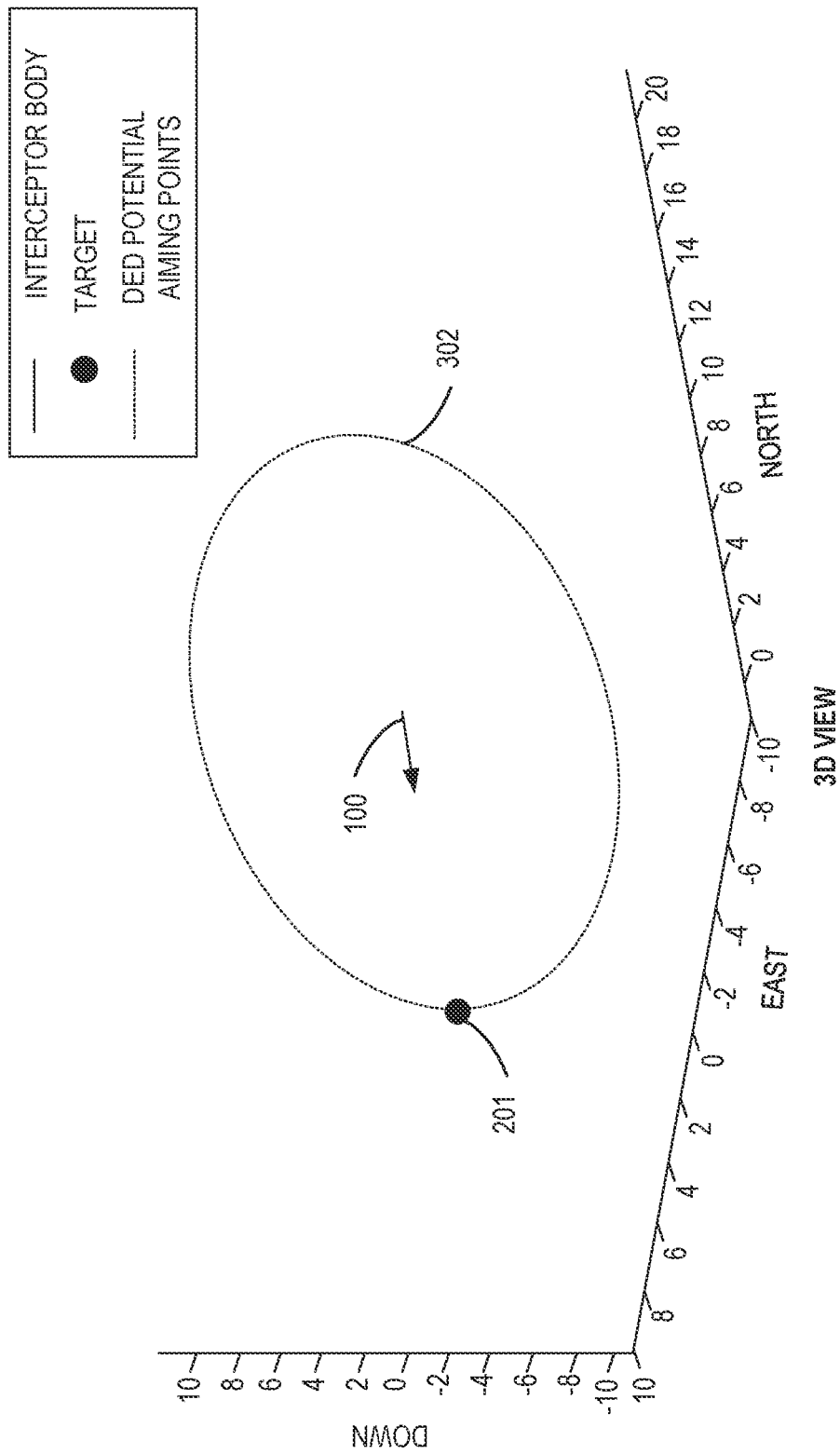
FIGS. 3-5 depict example scenarios of tracking a target.
Figure 4:
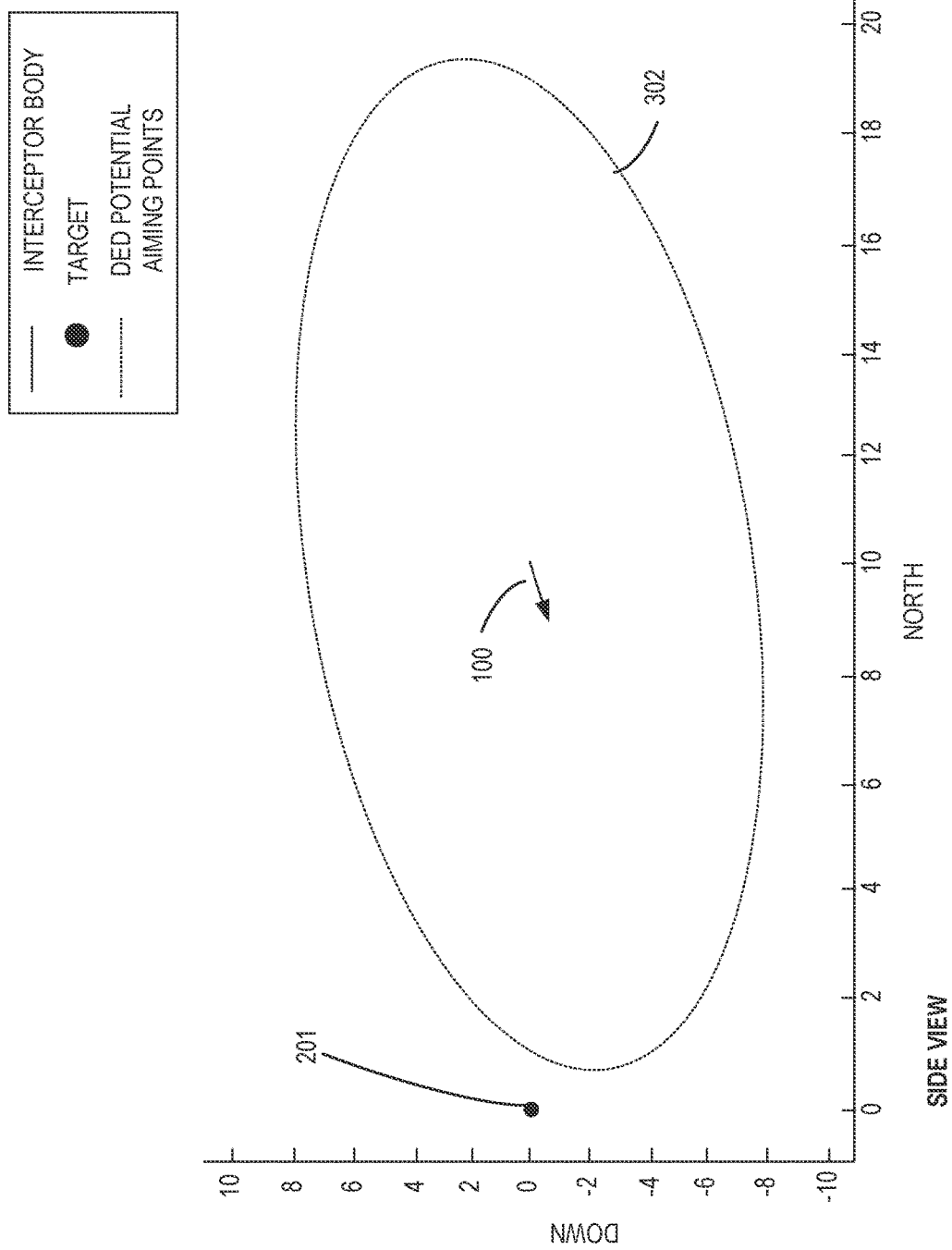
Figure 5:
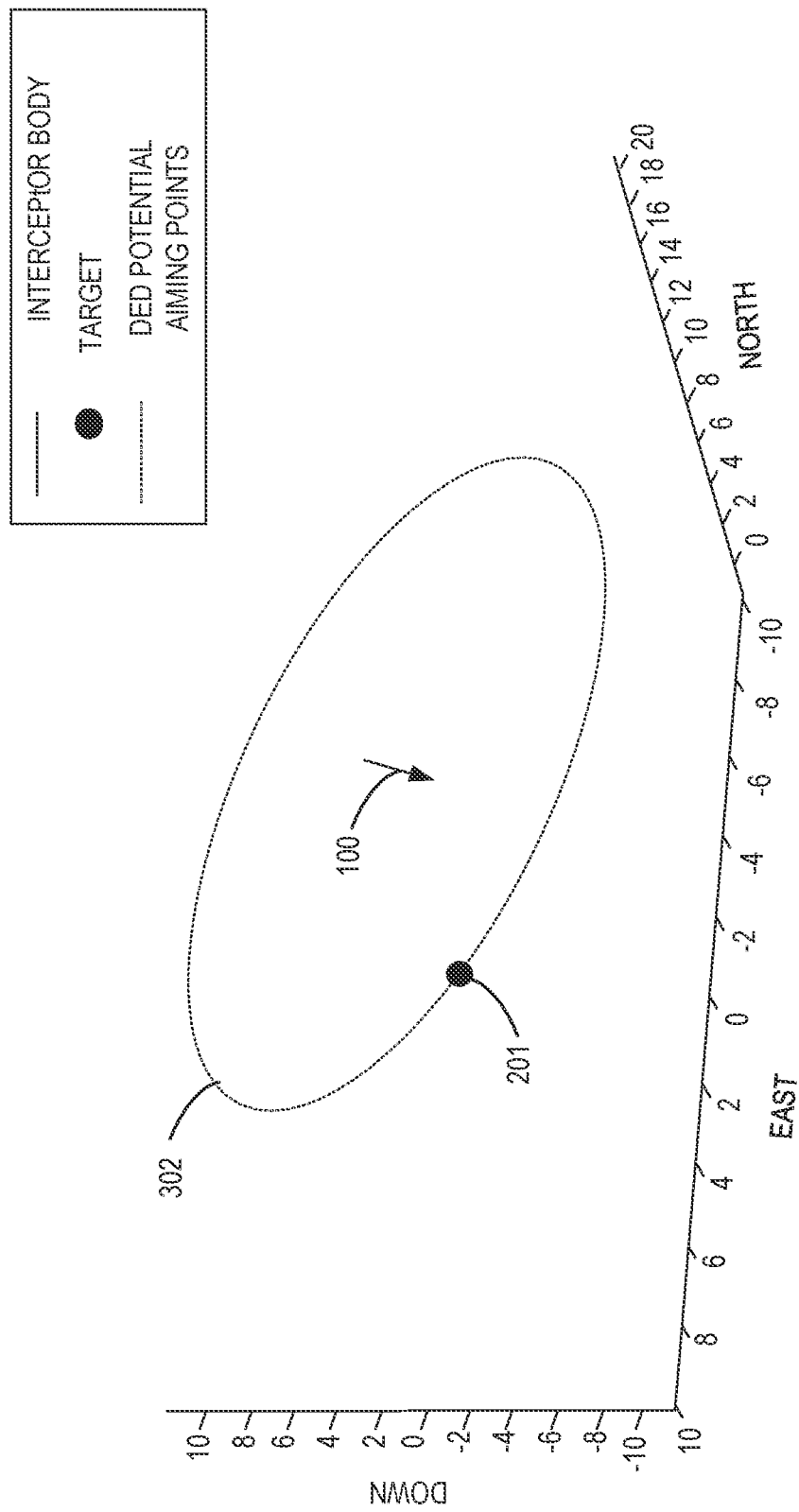

FIGS. 3-5 depict example scenarios of tracking the target 201. Turning to FIG. 3, the aircraft 100 is shown with corresponding determined aiming points 302. In this example, the aiming points 302 correspond to a range of motion (e.g., a range of swivel) of the aiming/pointing device 110 (shown in FIG. 1). In particular, the example aircraft 100 has no pitch or roll angle and, thus, it can be trivial to orient and/or align the aiming/pointing device 110 with the target 201. While the example of FIG. 3 (and other examples shown herein) depict the aiming points 302 as generally circular and/or ellipsoid, examples disclosed herein can be related to more limited angular movement ranges (e.g., −75 degrees to +75 degrees of swivel motion).

FIG. 4 depicts the example aircraft 100 in a scenario not utilizing examples disclosed herein. In this example, the aircraft 100 is at a pitch angle of 30 degrees and a roll angle of 45 degrees. Further, according to examples disclosed herein, although the relative position between the aircraft 100 and the target 201 has not changed from the example of FIG. 3, the non-zero pitch and roll angles of the aircraft 100 in conjunction with the heading angle of the aircraft 100 do not cause the aforementioned aiming points 302 to intersect the target 201 and, thus, the aiming/pointing device 110 is not at an orientation where it can be aimed at the target 201. In other words, no movement of the aiming/pointing device 110 within its respective movement range will cause the aiming/pointing device 110 to be aimed/oriented at the target 201.

Turning to FIG. 5, in contrast to the scenario of FIG. 4, the aircraft 100 is shown implementing examples disclosed herein. In this example, the aircraft 100 has a pitch angle of 30 degrees and a roll angle of 45 degrees. Accordingly, the example aircraft 100 is guided to a heading angle/direction to align the aiming points 302 to intersect the target 201 despite the non-zero pitch and roll angles of the aircraft 100. In turn, the aiming/pointing device 110 can perform its function (e.g., disabling, marking, firing, image/picture taking, net dispensing/launching, etc.) while directed and/or aimed at the target 201.

Figure 6:
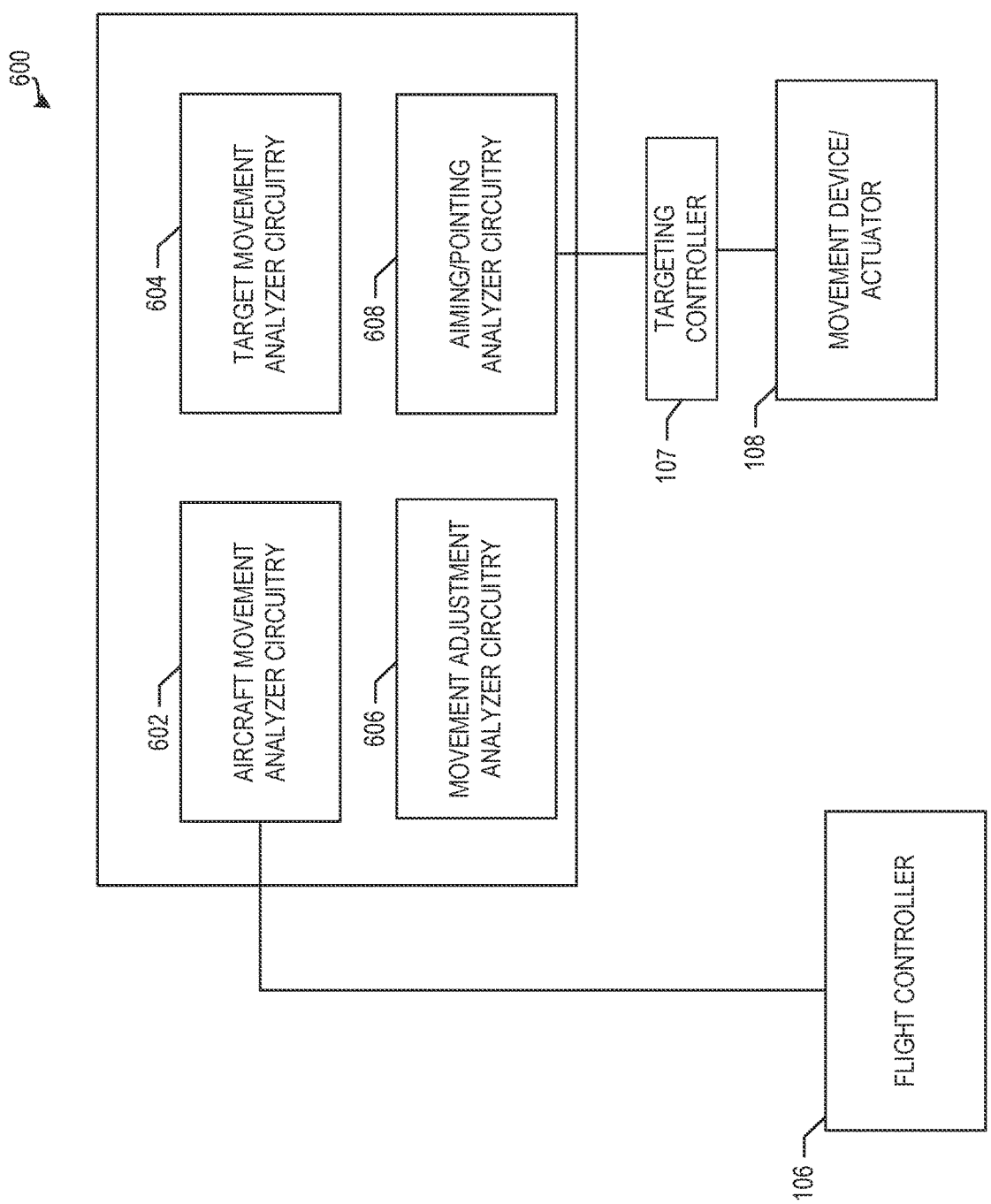
FIG. 6 is a block diagram of an example pointing device analysis system in accordance with teachings of this disclosure.

FIG. 6 is a block diagram of an example pointing device analysis system 600 to control aiming and/or an orientation of the aiming/pointing device 110. The example pointing device analysis system 600 can be implemented in the aircraft 100, the flight controller 106 and/or the targeting controller 107. The example pointing device analysis system 600 of FIG. 6 may be instantiated (e.g., creating an instance of, bring into being for any length of time, materialize, implement, etc.) by processor circuitry such as a central processing unit executing instructions. Additionally or alternatively, the pointing device analysis system 600 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by microprocessor circuitry executing instructions to implement one or more virtual machines and/or containers.

The pointing device analysis system 600 of the illustrated example includes aircraft movement analyzer circuitry 602, example target movement analyzer circuitry 604, example movement adjuster analyzer circuitry 606 and example aiming/pointing analyzer circuitry 608. According to examples disclosed herein, the pointing device analysis system 600 is communicatively coupled to and/or includes the aircraft flight controller 106, the targeting controller 107 and/or an example actuator 108, which can be implemented to cause and/or affect movement (e.g., orientation changes, swiveling movement, etc.) of the aiming/pointing device 110, for example.

The aircraft movement analyzer circuitry 602 of the illustrated example is implemented to determine and/or characterize a position and/or orientation of the aircraft 100 and/or the target 201 (e.g., in GPS and/or global coordinates). According to examples disclosed herein, the aircraft movement analyzer circuitry 602 determines a yaw, pitch and/or roll of the aircraft 100 as well as a position of the aircraft (e.g., a relative position to the target 201) based on sensor information from the sensor(s) 202 and/or the sensor(s) 204 shown in FIG. 2A. In some examples, the aircraft movement analyzer circuitry 602 is instantiated by processor circuitry executing aircraft movement analyzer circuitry instructions and/or configured to perform operations such as those represented by the flowchart of FIG. 7.

In the illustrated example of FIG. 6, the target movement analyzer circuitry 604 is implemented to determine a position and/or orientation of the target (e.g., the target 201 of FIG. 2A). In some examples, the target movement analyzer circuitry 604 is instantiated by processor circuitry executing target movement analyzer circuitry instructions and/or configured to perform operations such as those represented by the flowchart of FIG. 7.

The example aiming/pointing analyzer circuitry 608 determines aiming points and/or an aiming region associated with the aiming/pointing device 110. In this example, the example aiming/pointing analyzer circuitry 608 determines the aiming points based on a range of movement of the aiming/pointing device 110 in conjunction with a position and orientation (e.g., a yaw angle, a pitch angle, a roll angle, etc.) of the aircraft 100. In some examples, the aiming/pointing analyzer circuitry 608 is instantiated by processor circuitry executing aiming/pointing analyzer circuitry instructions and/or configured to perform operations such as those represented by the flowchart of FIG. 7.

The example movement adjuster analyzer circuitry 606 is implemented to determine a movement of the aircraft 100 and/or the aiming/pointing device 110. In this example, the movement is determined based on the aforementioned aiming points and the orientation of the aircraft 100 along with a position of the target 201. In particular, the movement can be determined to cause intersection of the aiming points (associated with aiming/pointing device 110) with the target 201. In some examples, the movement adjuster analyzer circuitry 606 is instantiated by processor circuitry executing movement adjuster analyzer circuitry instructions and/or configured to perform operations such as those represented by the flowchart of FIG. 7.

The following are example calculations that can be performed by examples disclosed herein. In particular, any of the aircraft movement analyzer circuitry 602, the example target movement analyzer circuitry 604, the example movement adjuster analyzer circuitry 606 or the example aiming/pointing analyzer circuitry 608 can perform the example calculations. However, any other appropriate calculations and/or methodologies can be utilized instead. In example Equation 1 below, it is demonstrated that, to transform a three-dimensional unit vector $v_1$ into another vector, $v_2$, in the same reference frame, the following Euler axis and Euler rotation angle can be utilized in example Equations 1 and 2 below:

$$\hat{\Phi}_{Euler} = \frac{v_1 \times v_2}{|v_1 \times v_2|} \quad (1)$$

$$\phi_{Euler} = \sin^{-1}\left(\frac{|v_1 \times v_2|}{|v_1||v_2|}\right) \quad (2)$$

where $\hat{\Phi}_{Euler}$ is the Euler axis and $\phi_{Euler}$ the angle of rotation about that axis. To apply this theory to the pointing problem of interest, the proper value of a heading angle of a vehicle, $\psi$, and the elevation, el, are calculated such that −Euler=0, where $v1=g_x$ and $v_2$=the line-of-sight unit vector, LÔS. In other words, heading and elevation angle can be determined via example Equation 3:

$$g_x \times L\hat{O}S = 0 \quad (3)$$

According to examples disclosed herein, both vectors can be represented in the same coordinate frame. Since the line-of-sight vector is typically available in the inertial frame, the vector, $g_x$, can be converted to this frame as well. Accordingly, this vector can be converted to the body-fixed frame in the following example manner:

$$g_x^B = \begin{bmatrix} \cos(el) & 0 & \sin(el) \\ 0 & 1 & 0 \\ -\sin(el) & 0 & \cos(el) \end{bmatrix} g_x^G = \begin{bmatrix} \cos(el) \\ 0 \\ -\sin(el) \end{bmatrix} \quad (4)$$

Next, a gun-fixed x-axis is converted to the inertial frame via as shown in example Equations 5 and 6 below:

$$g_x^N = \begin{bmatrix} \cos(\theta)\cos(\psi) & -\cos(\phi)\sin(\psi) + \sin(\phi)\sin(\theta)\cos(\psi) & \sin(\phi)\sin(\psi) + \cos(\phi)\sin(\theta)\cos(\psi) \\ \cos(\theta)\sin(\psi) & \cos(\phi)\cos(\psi) + \sin(\phi)\sin(\theta)\sin(\psi) & -\sin(\phi)\cos(\psi) + \cos(\phi)\sin(\theta)\sin(\psi) \\ -\sin(\theta) & \sin(\phi)\cos(\theta) & \cos(\phi)\cos(\theta) \end{bmatrix} g_x^B \quad (5)$$

$$g_x^N = \begin{bmatrix} \cos(\theta)\cos(\psi)\cos(el) - (\sin(\phi)\sin(\psi) + \cos(\phi)\sin(\theta)\cos(\psi))\sin(el) \\ \cos(\theta)\sin(\psi)\cos(el) - (-\sin(\phi)\cos(\psi) + \cos(\phi)\sin(\theta)\sin(\psi))\sin(el) \\ -\sin(\theta)\cos(el) - \cos(\phi)\cos(\theta)\sin(el) \end{bmatrix} \quad (6)$$

where θ is the pitch Euler angle of the aircraft 100 and φ is the roll Euler angle of the aircraft 100. This vector $g_x^N$ can be rewritten as the following matrix-vector multiplication shown in example Equation 7 below.

$$g_x^N = \begin{bmatrix} 0 & 0 & \cos(\theta) & -\cos(\phi)\sin(\theta) & 0 & -\sin(\phi) \\ 0 & 0 & 0 & \sin(\phi) & \cos(\theta) & -\cos(\phi)\sin(\theta) \\ -\sin(\theta) & -\cos(\phi)\cos(\theta) & 0 & 0 & 0 & 0 \end{bmatrix} \begin{bmatrix} \cos(el) \\ \sin(el) \\ \cos(\psi)\cos(el) \\ \cos(\psi)\sin(el) \\ \sin(\psi)\cos(el) \\ \sin(\psi)\sin(el) \end{bmatrix} \quad (7)$$

Note that example Equation 3 can be rewritten as example Equation 8 below $$g_x \times \vec{LOS} = \begin{bmatrix} 0 & \hat{LOS}_D & -\hat{LOS}_E \\ -\hat{LOS}_D & 0 & \hat{LOS}_N \\ \hat{LOS}_E & -\hat{LOS}_N & 0 \end{bmatrix} g_x^N = 0 \quad (8)$$

where the subscripts N, E, and D represent north, east, down, respectively, as shown in FIG. 2B. Therefore, according to examples disclosed herein, the pointing problem can be redefined by solving for the vehicle heading angle, ψ, and gun elevation angle, el, such that the following example Equation 9 is satisfied:

$$\begin{bmatrix} \hat{LOS}_E S(\theta) & \hat{LOS}_E C(\phi)C(\theta) & 0 & \hat{LOS}_D S(\theta) & \hat{LOS}_D C(\theta) & -\hat{LOS}_D C(\phi)S(\theta) \\ -\hat{LOS}_N S(\theta) & -\hat{LOS}_N C(\phi)C(\theta) & -\hat{LOS}_D C(\theta) & \hat{LOS}_D C(\phi)S(\theta) & 0 & \hat{LOS}_D S(\phi) \\ 0 & 0 & \hat{LOS}_E C(\theta) & -\hat{LOS}_E C(\phi)S(\theta) & -\hat{LOS}_N C(\theta) & -\hat{LOS}_E S(\phi) + \hat{LOS}_N C(\phi)S(\theta) \end{bmatrix} * \begin{bmatrix} C(el) \\ S(el) \\ C(\psi)C(el) \\ C(\psi)S(el) \\ S(\psi)C(el) \\ S(\psi)S(el) \end{bmatrix} = 0 \quad (9)$$

where for the sake of space/compactness, C(·) and S(·) represents cosine and sine of the argument, respectively.

According to examples disclosed herein, angle commands can be calculated and/or solved. In order to solve for the proper angles to command, the three equations represented by example Equation 9 can each be rearranged to solve for tan(el). This results in the following example Equations 10, 11 and 12:

$$\tan(el) = \frac{\hat{LOS}_E \cos(\theta)\cos(\phi) - \hat{LOS}_N \cos(\theta)\sin(\psi)}{(\hat{LOS}_E \cos(\phi)\sin(\theta) + \hat{LOS}_N \sin(\phi))\cos(\psi) + (\hat{LOS}_E \sin(\phi) - \hat{LOS}_N \cos(\phi)\sin(\theta))\sin(\psi)} \quad (10)$$

$$\tan(el) = \frac{\hat{LOS}_E \sin(\theta) - \hat{LOS}_D \cos(\theta)\sin(\psi)}{\hat{LOS}_D \cos(\phi)\sin(\theta)\sin(\psi) - \hat{LOS}_E \cos(\phi)\cos(\theta) + \hat{LOS}_D \sin(\phi)\cos(\psi)} \quad (11)$$

$$\tan(el) = \frac{\hat{LOS}_N \sin(\theta) + \hat{LOS}_D \cos(\theta)\cos(\psi)}{\hat{LOS}_D \cos(\phi)\sin(\theta)\cos(\psi) - \hat{LOS}_N \cos(\phi)\cos(\theta) + \hat{LOS}_D \sin(\theta)\sin(\psi)} \quad (12)$$

Accordingly, setting the right hand side of equations (10) and (11) [OR (10) and (12) OR (11) and (12)] equal, results in example Equation 13 below:

$$(-\hat{LOS}_E \cos(\phi) - \hat{LOS}_N \sin(\phi)\sin(\theta))\cos(\psi) + \quad (13)$$
$$(\hat{LOS}_N \cos(\phi) - \hat{LOS}_E \sin(\phi)\sin(\theta))\sin(\psi) = \hat{LOS}_D \sin(\phi)\cos(\theta)$$

In turn, based on a trigonometric identity where for two scalars a and b and an angle x, the following example Equations 14, 15 and 16 provide that:

$$a \sin(x) + b \cos(x) = c \sin(x + \zeta) \quad (14)$$

where $$c = \sqrt{a^2 + b^2} \quad (15)$$

$$\zeta = a\tan(b, a) \quad (16)$$

As a result, example Equation 13 can yield the following example Equation 17:

$$\bar{c}_0 \sin\left(\psi + a\tan\left(\frac{-L\hat{O}S_F \cos(\phi) - L\hat{O}S_N \sin(\phi)\sin(\theta)}{L\hat{O}S_N \cos(\phi) - L\hat{O}S_F \sin(\phi)\sin(\theta)}\right)\right) = L\hat{O}S_D \sin(\phi)\cos(\theta) \quad (17)$$

$$\bar{c}_0 = \quad (18)$$
$$\left(\sqrt{(-L\hat{O}S_F \cos(\phi) - L\hat{O}S_N \sin(\phi)\sin(\theta))^2 + (L\hat{O}S_N \cos(\phi) - L\hat{O}S_F \sin(\phi)\sin(\theta))^2}\right)$$

Therefore, setting the commanded yaw angle can be accomplished according to example Equation 19 below:

$$\psi_C = a\sin\left(\frac{(L\hat{O}S_D \sin(\phi)\cos(\theta))}{\sqrt{(-L\hat{O}S_F \cos(\phi) - L\hat{O}S_N \sin(\phi)\sin(\theta))^2 + (L\hat{O}S_N \cos(\phi) - L\hat{O}S_F \sin(\phi)\sin(\theta))^2}}\right) - \quad (19)$$
$$a\tan\left(\frac{-L\hat{O}S_F \cos(\phi) - L\hat{O}S_N \sin(\phi)\sin(\theta)}{L\hat{O}S_N \cos(\phi) - L\hat{O}S_F \sin(\phi)\sin(\theta)}\right)$$

Further, setting the commanded elevation angle, $e_{IC}$, according to example Equations 10, 11, or 12 can be used to solve the pointing problem.

According to example disclosed herein, simulation and/or simulation-related calculations can be implemented to estimate and/or determine characteristics of pointing. For example, commands pertaining to gun pointing can be integrated into a simulation model such that a kinetic impact vehicle guidance is replaced with a strafing guidance such that the aircraft 100 attempts to track the target 201 and then trail the target 201 by a distance of 5 meters (m), for example. The following example simplified gun dynamics were assumed:

$$\omega = \frac{del}{dt} \quad (20)$$

$$\begin{bmatrix} \dot{el} \\ \dot{\omega} \end{bmatrix} = \begin{bmatrix} 0 & 1 \\ 0 & 0 \end{bmatrix} + \begin{bmatrix} 0 \\ \frac{3}{m_g L_g^2} \end{bmatrix} u \quad (21)$$

where $m_g=0.5$ kilograms(kg) is the mass of the gun, $L_g=0.5$ m is the length of the gun barrel and u is the control torque. Accordingly, a control law is utilized to yield example Equation 22 below:

$$u = -K\begin{bmatrix} el - el_C \\ \omega \end{bmatrix} \quad (22)$$

where the control gain matrix, K, was solved using the LQR technique with tuning matrices as shown in example Equation 23 below:

$$Q = \begin{bmatrix} 5 & 0 \\ 0 & 5 \end{bmatrix} \quad R = 1 \quad (23)$$

Note that at achieving the offset distance of 5 m, the aircraft 100 trails the target 201. Accordingly, the pointing error which is calculated as example Equation 24 below:

pointing error=$\|g_x \times L\hat{O}S\|$ \quad (24)

Examples can be implemented for aiming/pointing devices or guns with an independent pan angle.

$$g_x^B = \begin{bmatrix} \cos(pan) & \sin(pan) & 0 \\ -\sin(pan) & \cos(pan) & 0 \\ 0 & 0 & 1 \end{bmatrix} g_x^G = \begin{bmatrix} \cos(pan) \\ \sin(pan) \\ 0 \end{bmatrix} \quad (25)$$

$$g_x^N = \quad (26)$$
$$\begin{bmatrix} \cos(\theta)\cos(\psi)\cos(pan) + (-\cos(\phi)\sin(\psi) + \sin(\phi)\sin(\theta)\cos(\psi))\sin(pan) \\ \cos(\theta)\sin(\psi)\cos(pan) + (\cos(\phi)\cos(\psi) + \sin(\phi)\sin(\theta)\sin(\psi))\sin(pan) \\ -\sin(\theta)\cos(pan) + \sin(\phi)\cos(\theta)\sin(pan) \end{bmatrix}$$

-continued $$g_x \times L\hat{O}S = \begin{bmatrix} 0 & L\hat{O}S_D & -L\hat{O}S_F \\ -L\hat{O}S_D & 0 & L\hat{O}S_N \\ L\hat{O}S_F & -L\hat{O}S_N & 0 \end{bmatrix} g_x^N = 0 \quad (27)$$

$$\tan(pan) = \frac{L\hat{O}S_D \cos(\theta)\sin(\psi) + L\hat{O}S_F \sin(\theta)}{L\hat{O}S_F \sin(\phi)\cos(\theta) - L\hat{O}S_D(\cos(\phi)\cos(\psi) + \sin(\phi)\sin(\theta)\sin(\psi))} \quad (28)$$

$$\tan(pan) = \quad (29)$$
$$\frac{L\hat{O}S_D \cos(\theta)\cos(\psi) + L\hat{O}S_N \sin(\theta)}{L\hat{O}S_N \sin(\phi)\cos(\theta) - L\hat{O}S_D(-\cos(\theta)\sin(\psi) + \sin(\phi)\sin(\theta)\cos(\psi))}$$

$$\tan(pan) = \frac{(L\hat{O}S_N \cos(\theta)\sin(\psi) - L\hat{O}S_F \cos(\theta)\cos(\psi))}{L\hat{O}S_F(-\cos(\phi)\sin(\psi) + \sin(\phi)\sin(\theta)\cos(\psi)) - L\hat{O}S_N(\cos(\theta)\cos(\psi) + \sin(\phi)\sin(\theta)\sin(\psi))} \quad (30)$$

Equating the right hand side of example Equations 28 and 29 yields the following:

$$L\hat{O}S_D \cos(\phi)\cos(\theta) + (L\hat{O}S_N \cos(\psi) + L\hat{O}S_F \sin(\psi))\cos(\phi)\sin(\theta) = \quad (31)$$
$$(L\hat{O}S_F \cos(\psi) - L\hat{O}S_N \sin(\psi))\sin(\phi)$$

Combining the trigonometric identity of example Equation 14 above yields the following:

$$\bar{c}_1 \sin\left(\theta + a\tan\left(\frac{L\hat{O}S_D}{(L\hat{O}S_N \cos(\psi) + L\hat{O}S_F \sin(\psi))}\right)\right) = \quad (32)$$
$$(L\hat{O}S_F \cos(\psi) - L\hat{O}S_N \sin(\psi))\tan(\phi)$$

$$\bar{c}_1 = \sqrt{L\hat{O}S_D^2 + (L\hat{O}S_N \cos(\psi) + L\hat{O}S_F \sin(\psi))^2} \quad (33)$$

Therefore, the commanded pitch angle can be solved via example Equation 34:

$$\theta_C = a\sin\left(\frac{(L\hat{O}S_F \cos(\psi) - L\hat{O}S_N \sin(\psi))\tan(\phi)}{\sqrt{L\hat{O}S_D^2 + (L\hat{O}S_N \cos(\psi) + L\hat{O}S_F \sin(\psi))^2}}\right) - \quad (34)$$
$$a\tan\left(\frac{L\hat{O}S_D}{(L\hat{O}S_N \cos(\psi) + L\hat{O}S_F \sin(\psi))}\right)$$

Examples disclosed herein can be utilized in commanding aerodynamic angles. A solution to the pointing problem with a pitching gun is present in example Equation 35 below:

$$\psi_C = -a\sin\left(\frac{(\widehat{LOS}_D\sin(\phi)\cos(\theta))}{\left(\sqrt{(-\widehat{LOS}_E\cos(\phi) - \widehat{LOS}_N\sin(\phi)\sin(\theta))^2 + (\widehat{LOS}_N\cos(\phi) - \widehat{LOS}_E\sin(\phi)\sin(\theta))^2}\right)}\right) - a\tan\left(\frac{-\widehat{LOS}_E\cos(\phi) - \widehat{LOS}_N\sin(\phi)\sin(\theta)}{\widehat{LOS}_N\cos(\phi) - \widehat{LOS}_E\sin(\phi)\sin(\theta)}\right) \quad (35)$$

Accordingly, the commanded aerodynamic angles, $\alpha_C$ and $\beta_C$, can satisfy the following example Equation 36 below:

$$\begin{bmatrix} \cos(\theta)\cos(\psi_C) & -\cos(\phi)\sin(\psi_C)+\sin(\phi)\sin(\theta)\cos(\psi_C) & \sin(\phi)\sin(\psi_C)+\cos(\phi)\sin(\theta)\cos(\psi_C) \\ \cos(\theta)\sin(\psi_C) & \cos(\phi)\cos(\psi_C)+\sin(\phi)\sin(\theta)\sin(\psi_C) & -\sin(\phi)\cos(\psi_C)+\cos(\phi)\sin(\theta)\sin(\psi_C) \\ -\sin(\theta) & \sin(\phi)\cos(\theta) & \cos(\phi)\cos(\theta) \end{bmatrix} \begin{bmatrix} V_T\cos(\alpha_C)\cos(\beta_C) \\ V_T\sin(\beta_C) \\ V_T\sin(\alpha_C)\cos(\beta_C) \end{bmatrix} = \begin{bmatrix} V_N \\ V_E \\ V_D \end{bmatrix} \quad (36)$$

where $V_T = (V_N^2 + V_E^2 + V_D^2)^{1/2}$. Therefore, if controlling aerodynamic angles, the proper commands can be given by example Equations 37, 38 and 39 below:

$$\beta_C = a\sin\left(\frac{1}{V_T}((-\cos(\phi)\sin(\psi_C) + \sin(\phi)\sin(\theta)\cos(\psi_C))V_N + (\cos(\phi)\cos(\psi_C) + \sin(\phi)\sin(\theta)\sin(\psi_C))V_E + \sin(\phi)\cos(\theta)V_D)\right) \quad (37)$$

$$\alpha_C = a\tan\left(\alpha_0\left(\frac{(\sin(\phi)\sin(\psi_C) + \cos(\phi)\sin(\theta)\cos(\psi_C))V_N + (-\sin(\phi)\cos(\psi_C) + \cos(\phi)\sin(\theta)\sin(\psi_C))V_E + \cos(\phi)\cos(\theta)V_D}{\cos(\theta)\cos(\psi_C)V_N + \cos(\theta)\sin(\psi_C)V_E - \sin(\theta)V_D}\right)\right) \quad (38)$$

$$\alpha_0 = \frac{1}{V_T\cos(\beta_C)} \quad (39)$$

Examples disclosed herein can be utilized with a yawing aiming/pointing device, such as a yawing gun, for example. Accordingly, a solution to the pointing problem with a yawing gun is shown in example Equation 40 below:

$$\theta_C = a\sin\left(\frac{(\widehat{LOS}_E\cos(\psi) - \widehat{LOS}_N\sin(\psi))\tan(\phi)}{\sqrt{\widehat{LOS}_D^2 + (\widehat{LOS}_N\cos(\psi) + \widehat{LOS}_E\sin(\psi))^2}}\right) - a\tan\left(\frac{\widehat{LOS}_D}{\widehat{LOS}_N\cos(\psi) + \widehat{LOS}_E\sin(\psi)}\right) \quad (40)$$

Accordingly, proper aerodynamic angle commands are provided by example Equations 41 and 42 below.

$$\beta_C = a\sin\left(\frac{1}{V_T}((-\cos(\phi)\sin(\psi) + \sin(\phi)\sin(\theta_C)\cos(\psi))V_N + (\cos(\phi)\cos(\psi) + \sin(\phi)\sin(\theta_C)\sin(\psi))V_E + \sin(\phi)\cos(\theta_C)V_D)\right) \quad (41)$$

-continued $$\alpha_C = a\tan\left(\alpha_0\left(\frac{(\sin(\phi)\sin(\psi) + \cos(\phi)\sin(\theta_C)\cos(\psi))V_N + (-\sin(\phi)\cos(\psi) + \cos(\phi)\sin(\theta_C)\sin(\psi))V_E + \cos(\phi)\cos(\theta_C)V_D}{\cos(\theta_C)\cos(\psi)V_N + \cos(\theta_C)\sin(\psi)V_E - \sin(\theta_C)V_D}\right)\right) \quad (42)$$

The above equations are only examples and any appropriate other example calculations and/or methodology can be implemented instead.

While an example manner of implementing the pointing device analysis system 600 of FIG. 6 is illustrated in FIG. 6, one or more of the elements, processes, and/or devices illustrated in FIG. 6 may be combined, divided, re-arranged, omitted, eliminated, and/or implemented in any other way. Further, the example aircraft movement analyzer circuitry 602, the example target movement analyzer circuitry 604, the example movement adjuster analyzer circuitry 606 and the example aiming/pointing analyzer circuitry 608, and/or, more generally, the example pointing device analysis system 600 of FIG. 6, may be implemented by hardware alone or by hardware in combination with software and/or firmware. Thus, for example, any of the example aircraft movement analyzer circuitry 602, the example target movement analyzer circuitry 604, the example movement adjuster analyzer circuitry 606 and the example aiming/pointing analyzer circuitry 608, and/or, more generally, the example pointing device analysis system 600, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example pointing device analysis system 600 of FIG. 6 may include one or more elements, processes, and/or devices in addition to, or instead of, those illustrated in FIG. 6, and/or may include more than one of any or all of the illustrated elements, processes and devices.

Figure 7:
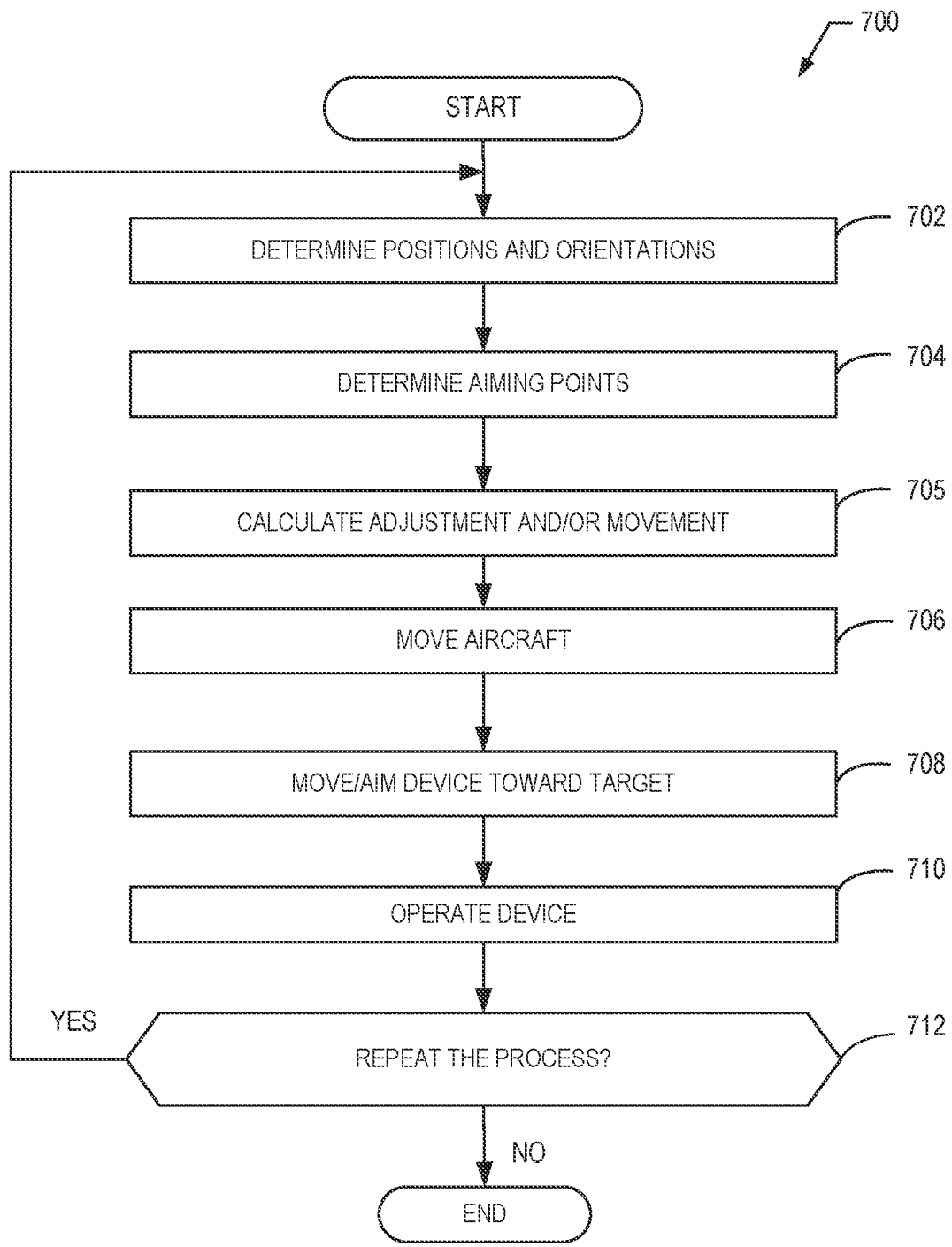
FIG. 7 is a flowchart representative of example machine readable instructions and/or example operations that may be executed by example processor circuitry to implement the example pointing system of FIG. 2A and/or the example pointing device analysis system of FIG. 6.

A flowchart representative of example machine readable instructions, which may be executed to configure processor circuitry to implement the pointing device analysis system 600 of FIG. 6, is shown in FIG. 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example pointing device analysis system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to direct aiming of the aiming/pointing device 110 toward the target 201. The machine readable instructions and/or the operations 700 of FIG. 7 begin at block 702, at which the aircraft movement analyzer circuitry 602 and/or the target movement analyzer circuitry 604 determines a position and orientation of the aircraft 100. In this example, the aircraft movement analyzer circuitry 602 also determines a position and/or orientation of the target 201.

At block 704, the aiming/pointing analyzer circuitry 608 of the illustrated example determines aiming points and/or an aiming region based on the a movement range of the aiming/pointing device 110 and an orientation (and position) of the aircraft 100. In this example, the orientation includes a pitch and a roll of the aircraft 100.

At block 705, the example movement adjustment analyzer circuitry 606 calculates and/or determines a movement (e.g., an adjusted movement) of the aircraft 100 and/or the aiming/pointing device 110. In this particular example, the adjusted movement corresponds to a heading of the aircraft 100 such that the aiming points corresponding to the aiming/pointing device 110 intersect the target 201.

At block 706, the aircraft movement analyzer circuitry of the illustrated example causes the aircraft 100 to be moved based on the determined movement. In this example, the aircraft 100 is moved to the heading to intersect the aiming points with the target 201, thereby aligning the aiming/pointing device 110 to the target 201.

At block 708, according to examples disclosed herein, the target movement analyzer circuitry 604 and/or the aiming/pointing analyzer circuitry 608 causes the aiming/pointing device 110 to be aimed and/or directed toward the target 201. In this example, the target movement analyzer circuitry 604 and/or the aiming/pointing analyzer circuitry 608 directs movement of the actuator 108 to swivel the aiming/pointing device 110 such that the aiming/pointing device 110 is aimed toward the target 201. In some examples, the target movement analyzer circuitry 604 and/or the aiming/pointing analyzer circuitry 608 takes into account a projectile speed and/or projectile motion of a projectile to be fired at the target 201 from aiming point device 110 when controlling and/or directing movement of the aiming/pointing device 110 and/or the aircraft 100 toward the target 201.

At block 710, the example aiming/pointing analyzer circuitry 608 causes the aiming pointing device 110 to be operated (e.g., fired, release a net, take a picture, etc.). This operation can vary based on the type of the aiming/pointing device 110. In some examples, multiple aiming/pointing devices of the aircraft 100 are operated (e.g., simultaneously operated) and/or triggered when the aiming/pointing devices are aimed at the target 201.

At block 712, the aiming/pointing analyzer circuitry 608 determines whether to repeat the process. If the process is to be repeated (block 712), control of the process returns to block 702. Otherwise, the process ends. The determination may be based on whether the aiming/pointing device 110 has successfully performed its operation on the target 201 (e.g., successfully fired a weapon at the target 201, disabled the target 201, successfully fired a net at the target 201, successfully obtained an image of the target 201, etc.).

Figure 8:
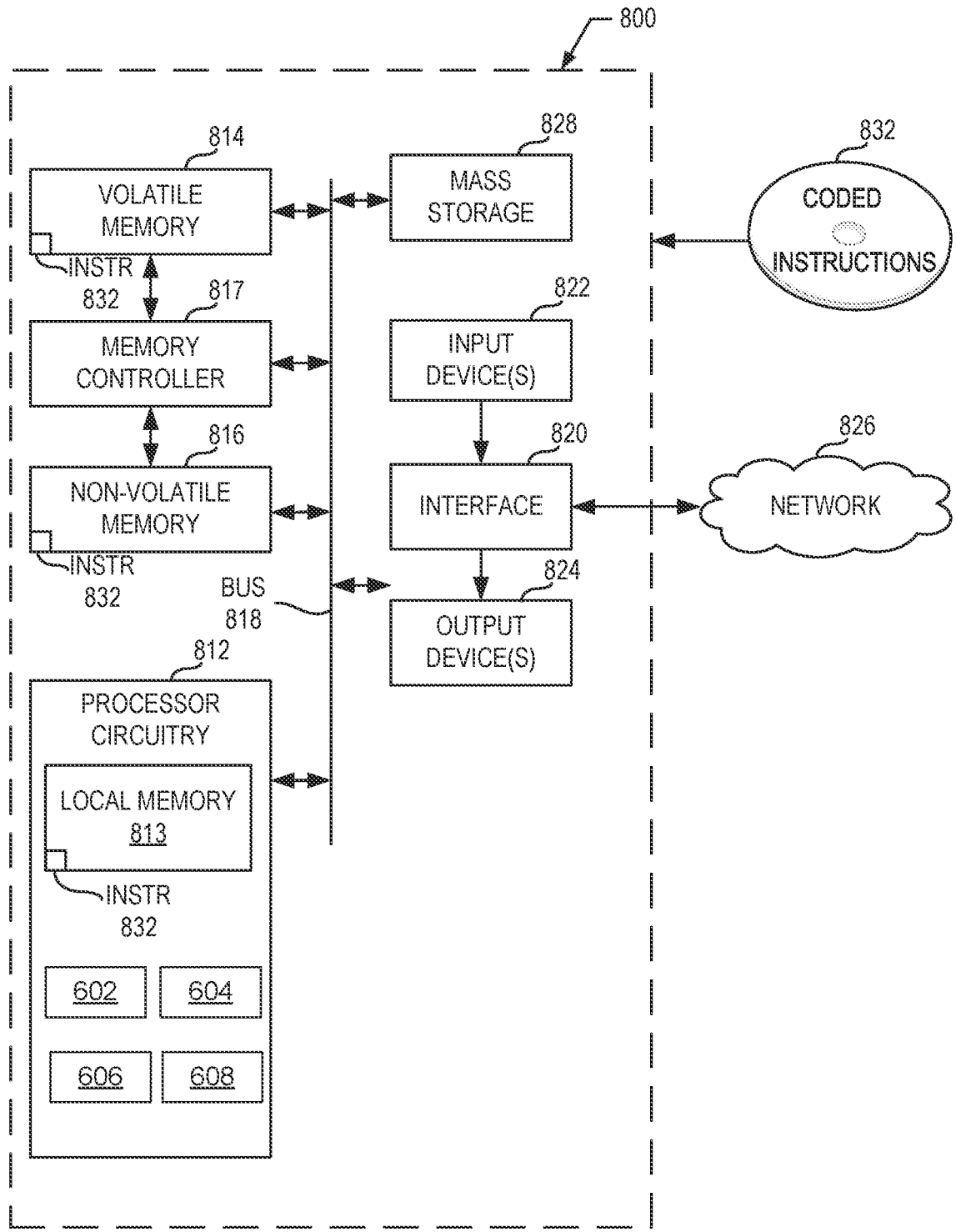
FIG. 8 is a block diagram of an example processing platform including processor circuitry structured to execute the example machine readable instructions and/or the example operations of FIG. 3 to implement the example pointing system of FIG. 2A and/or the example pointing device analysis system of FIG. 6.

FIG. 8 is a block diagram of an example processor platform 800 structured to execute and/or instantiate the machine readable instructions and/or the operations of FIG. 7 to implement the pointing device analysis system 600 of FIG. 6. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example aircraft movement analyzer circuitry 602, the example target movement analyzer circuitry 604, the example movement adjuster analyzer circuitry 606, and the example aiming/pointing analyzer circuitry 608.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIG. 7, may be stored in the mass storage device 828, in the volatile memory 814, in the non-volatile memory 816, and/or on a removable non-transitory computer readable storage medium such as a CD or DVD.

Figure 9:
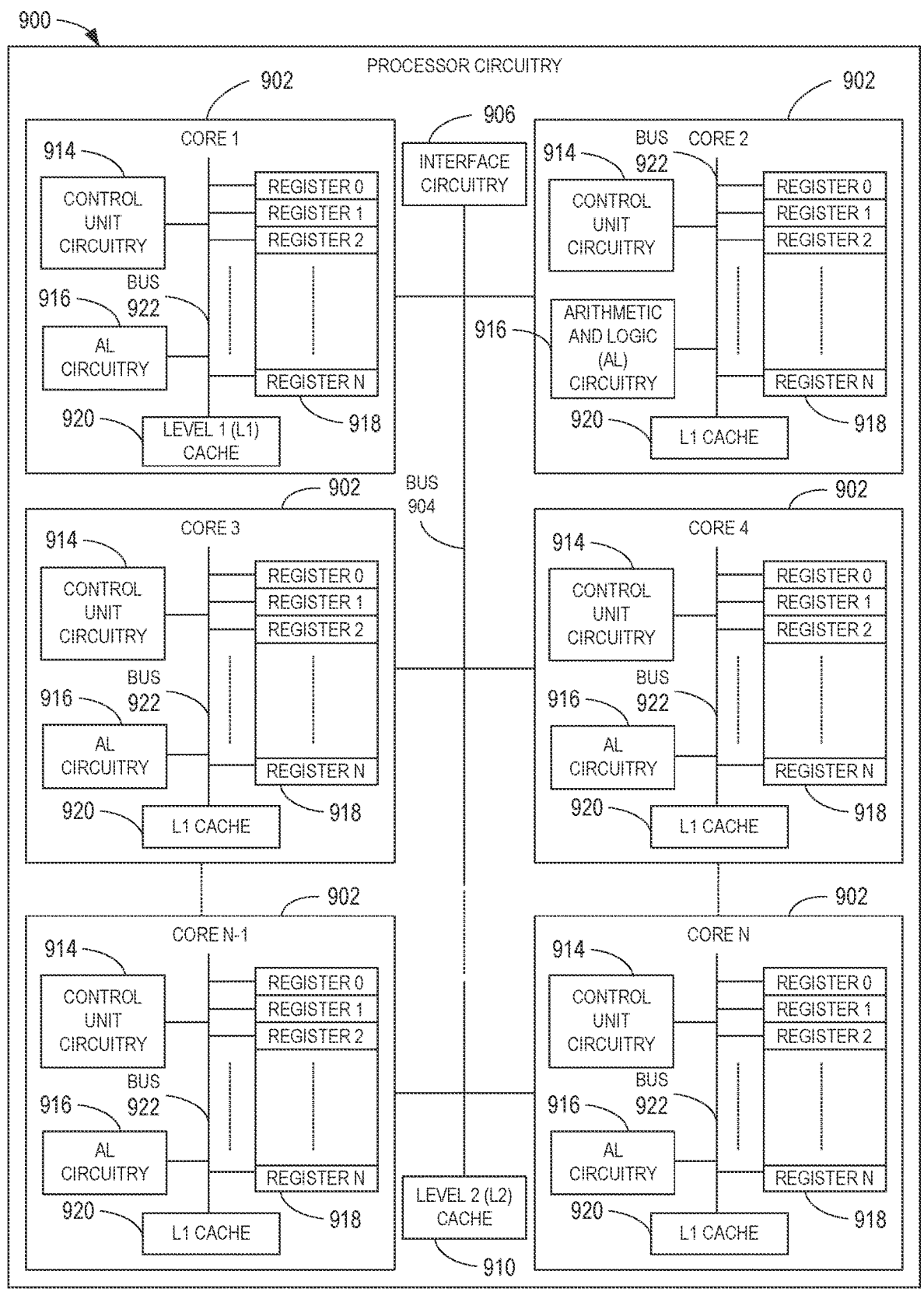
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowchart of FIG. 7 to effectively instantiate the pointing device analysis system 600 of FIG. 6 as logic circuits to perform the operations corresponding to those machine readable instructions. In some such examples, the pointing device analysis system 600 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
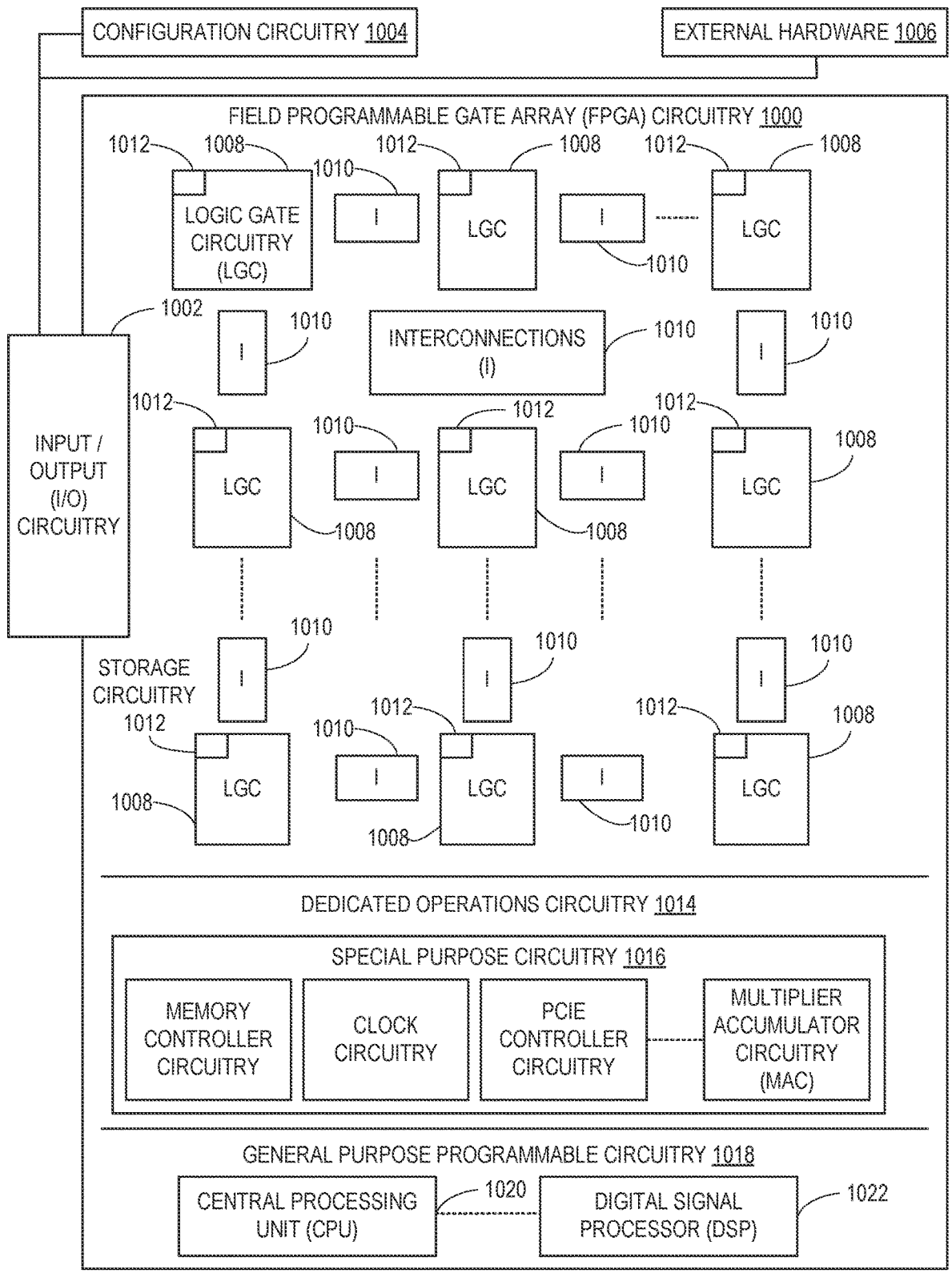
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 6 includes interconnections and logic circuitry that may be configured and/or interconnected in different ways after fabrication to instantiate, for example, some or all of the machine readable instructions represented by the flowchart of FIG. 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1000 may be structured to effectively instantiate some or all of the machine readable instructions of the flowchart of FIG. 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIG. 7 and/or other desired operations. The logic gate circuitry 1008 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 7 may be executed by one or more of the cores 902 of FIG. 9, a second portion of the machine readable instructions represented by the flowchart of FIG. 7 may be executed by the FPGA circuitry 1000 of FIG. 10, and/or a third portion of the machine readable instructions represented by the flowchart of FIG. 7 may be executed by an ASIC. It should be understood that some or all of the pointing device analysis system 600 of FIG. 6 may, thus, be instantiated at the same or different times. Some or all of the circuitry may be instantiated, for example, in one or more threads executing concurrently and/or in series. Moreover, in some examples, some or all of the pointing device analysis system 600 of FIG. 6 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
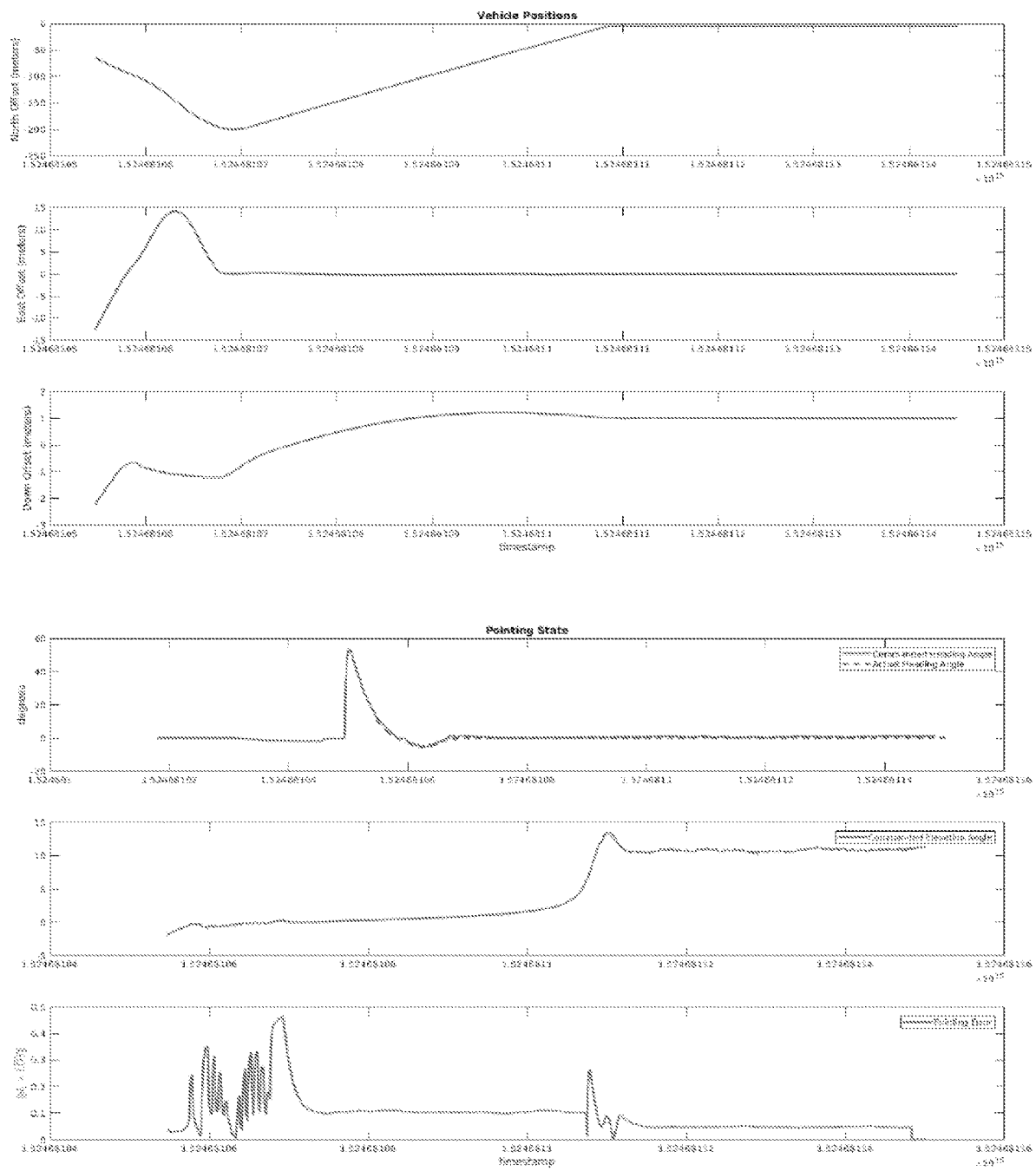
FIG. 11 depicts example simulation results according to examples disclosed herein.

FIG. 11 depicts example simulation results according to examples disclosed herein. In the illustrated example of FIG. 11, Based on a due north trajectory of a target vehicle, the strafing offset of 5 m occurs in the north direction, which is seen in the topmost plot. Further, an additional altitude offset is seen in the Down Offset plot (third from the top). In this example, because a kill vehicle (e.g., the aircraft 100) is flying below a target (e.g., the target 201), a slightly positive elevation angle is expected and observed, settling at around 10 degrees. As can be seen, a relatively small pointing error is achieved.

Example methods, apparatus, systems, and articles of manufacture to enable accurate control of aiming/pointing devices are disclosed herein. Further examples and combinations thereof include the following:

Example 1 includes an apparatus to aim an aiming device carried by an aircraft, the apparatus comprising at least one memory, machine readable instructions, and processor circuitry to at least one of instantiate or execute the machine readable instructions to determine a position of a target, determine an orientation of the aircraft, determine aiming points based on the orientation and a movement range of the aiming device, and determine a movement of at least one of the aircraft or the aiming device based on the aiming points and the position to orient the aiming device toward the target.

Example 2 includes the apparatus as defined in example 1, wherein the processor circuitry is to execute the instructions to move the aiming device based on the determined movement.

Example 3 includes the apparatus as defined in any of examples 1 or 2, wherein the aircraft is a first unmanned aerial vehicle and the target is a second unmanned aerial vehicle, and wherein the aiming device includes at least one of a weapon, a capture device or a disabling device.

Example 4 includes the apparatus as defined in example 3, wherein the processor circuitry is to determine the movement based on a rotational axis of the at least one of the weapon, the capture device or the disabling device.

Example 5 includes the apparatus as defined in any of examples 1 to 4, wherein the processor circuitry is to determine the movement based on intersecting the aiming points with the target.

Example 6 includes the apparatus as defined in any of examples 1 to 5, wherein the processor circuitry is to execute the instructions to determine the movement of the aiming device based on an orientation of the target.

Example 7 includes the apparatus as defined in any of examples 1 to 6, wherein the processor circuitry is to execute the instructions to move the aiming device based on an angular velocity of the aiming device.

Example 8 includes the apparatus as defined in any of examples 1 to 7, wherein the orientation determined by the processor circuitry includes a pitch angle and a roll angle of the aircraft.

Example 9 includes a non-transitory machine readable storage medium comprising instructions that, when executed, cause processor circuitry to at least determine a position of a target, determine an orientation of an aircraft carrying an aiming device, determine aiming points based on the orientation and a movement range of the aiming device, and determine a movement of at least one of the aircraft or the aiming device based on the aiming points and the position to orient the aiming device toward the target.

Example 10 includes the non-transitory machine readable storage medium as defined in example 9, wherein the instructions cause the processor circuitry to move the aiming device based on the determined movement.

Example 11 includes the non-transitory machine readable storage medium as defined in any of examples 9 or 10, wherein the aiming device includes at least one of a weapon, a capture device or a disabling device, and wherein the instructions cause the processor circuitry to determine the aiming points based on a rotational axis of the at least one of the weapon, the capture device or the disabling device.

Example 12 includes the non-transitory machine readable storage medium as defined in any of examples 9 to 11, wherein the aiming device is a weapon, and wherein the instructions cause the processor circuitry to determine the movement based on a projectile speed of a projectile to be fired from the weapon.

Example 13 includes the non-transitory machine readable storage medium as defined in any of examples 9 to 12, wherein the instructions cause the processor circuitry to determine the movement based on intersecting the aiming points with the target.

Example 14 includes the non-transitory machine readable storage medium as defined in example 13, wherein the instructions cause the processor circuitry to determine the movement of the aiming device based on an orientation of the target.

Example 15 includes a method of aiming an aiming device carried by an aircraft toward a target, the method comprising determining, by executing instructions with at least one processor, a position of the target, determining, by executing instructions with the at least one processor, an orientation of the aircraft, determining, by executing instructions with the at least one processor, aiming points based on a movement range of the aiming device and the orientation, and determining, by executing instructions with the at least one processor, a movement of at least one of the aircraft or the aiming device based on the aiming points and the position to orient the aiming device toward the target.

Example 16 includes the method as defined in example 15, further including moving the aiming device based on the determined movement.

Example 17 includes the method as defined in example 16, wherein the aircraft and the aiming device are moved simultaneously based on the determined movement.

Example 18 includes the method as defined in any of examples 15 to 17, wherein the aiming device includes at least one of a weapon, a capture device or a disabling device, and wherein the movement is determined based on a rotational axis of the at least one of the weapon, the capture device or the disabling device.

Example 19 includes the method as defined in any of examples 15 to 18, wherein the movement is determined based on an orientation of the target.

Example 20 includes the method as defined in any of examples 15 to 19, wherein the movement is determined based on intersecting the aiming points with the target.

From the foregoing, it will be appreciated that example systems, methods, apparatus, and articles of manufacture have been disclosed that enable accurate aiming of aiming/pointing devices mounted to aircraft that can be manned or unmanned. Examples disclosed herein can accommodate errors typically associated with an orientation of an aircraft and an aiming/pointing device in order to guide the aircraft to accurately point an aiming/pointing device toward a target. Further, examples disclosed herein can mitigate the effects of pointing error and changes in movement and/or orientation of the aircraft.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to aim an aiming device carried by an aircraft, the apparatus comprising:
    at least one memory;
    machine readable instructions; and
    processor circuitry to at least one of instantiate or execute the machine readable instructions to:
        determine a position of a target,
        determine an orientation of the aircraft,
        determine aiming points based on the orientation and a movement range of the aiming device, and
        determine a movement of at least one of the aircraft or the aiming device based on the aiming points and the position to orient the aiming device toward the target.

2. The apparatus as defined in claim 1, wherein the processor circuitry is to execute the instructions to move the aiming device based on the determined movement.

3. The apparatus as defined in claim 1, wherein the aircraft is a first unmanned aerial vehicle and the target is a second unmanned aerial vehicle, and wherein the aiming device includes at least one of a weapon, a capture device or a disabling device.

4. The apparatus as defined in claim 3, wherein the processor circuitry is to determine the movement based on a rotational axis of the at least one of the weapon, the capture device or the disabling device.

5. The apparatus as defined in claim 1, wherein the processor circuitry is to determine the movement based on intersecting the aiming points with the target.

6. The apparatus as defined in claim 1, wherein the processor circuitry is to execute the instructions to determine the movement of the aiming device based on an orientation of the target.

7. The apparatus as defined in claim 1, wherein the processor circuitry is to execute the instructions to move the aiming device based on an angular velocity of the aiming device.

8. The apparatus as defined in claim 1, wherein the orientation determined by the processor circuitry includes a pitch angle and a roll angle of the aircraft.

9. A non-transitory machine readable storage medium comprising instructions that, when executed, cause processor circuitry to at least:
    determine a position of a target;
    determine an orientation of an aircraft carrying an aiming device;

determine aiming points based on the orientation and a movement range of the aiming device; and determine a movement of at least one of the aircraft or the aiming device based on the aiming points and the position to orient the aiming device toward the target.

10. The non-transitory machine readable storage medium as defined in claim 9, wherein the instructions cause the processor circuitry to move the aiming device based on the determined movement.

11. The non-transitory machine readable storage medium as defined in claim 9, wherein the aiming device includes at least one of a weapon, a capture device or a disabling device, and wherein the instructions cause the processor circuitry to determine the aiming points based on a rotational axis of the at least one of the weapon, the capture device or the disabling device.

12. The non-transitory machine readable storage medium as defined in claim 9, wherein the aiming device is a weapon, and wherein the instructions cause the processor circuitry to determine the movement based on a projectile speed of a projectile to be fired from the weapon.

13. The non-transitory machine readable storage medium as defined in claim 9, wherein the instructions cause the processor circuitry to determine the movement based on intersecting the aiming points with the target.

14. The non-transitory machine readable storage medium as defined in claim 13, wherein the instructions cause the processor circuitry to determine the movement of the aiming device based on an orientation of the target.

15. A method of aiming an aiming device carried by an aircraft toward a target, the method comprising:

determining, by executing instructions with at least one processor, a position of the target;

determining, by executing instructions with the at least one processor, an orientation of the aircraft;

determining, by executing instructions with the at least one processor, aiming points based on a movement range of the aiming device and the orientation; and determining, by executing instructions with the at least one processor, a movement of at least one of the aircraft or the aiming device based on the aiming points and the position to orient the aiming device toward the target.

16. The method as defined in claim 15, further including moving the aiming device based on the determined movement.

17. The method as defined in claim 16, wherein the aircraft and the aiming device are moved simultaneously based on the determined movement.

18. The method as defined in claim 15, wherein the aiming device includes at least one of a weapon, a capture device or a disabling device, and wherein the movement is determined based on a rotational axis of the at least one of the weapon, the capture device or the disabling device.

19. The method as defined in claim 15, wherein the movement is determined based on an orientation of the target.

20. The method as defined in claim 15, wherein the movement is determined based on intersecting the aiming points with the target.

* * * * *